(12) United States Patent
Lin et al.

(10) Patent No.: US 8,875,009 B1
(45) Date of Patent: Oct. 28, 2014

(54) ANALYZING LINKS FOR NCX NAVIGATION

(75) Inventors: Jian Lin, Lynnwood, WA (US); Xi Long, Bellevue, WA (US); Michael Patrick Bacus, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 281 days.

(21) Appl. No.: 13/429,061

(22) Filed: Mar. 23, 2012

(51) Int. Cl.
*G06F 17/00* (2006.01)

(52) U.S. Cl.
USPC .......................................................... 715/206

(58) Field of Classification Search
CPC ............ G06F 17/2235; G06F 17/2241; G06F 17/30884; G06F 17/30867; G06F 17/30873; G06F 17/3089
USPC .......................................... 715/205, 206, 208
See application file for complete search history.

(56) References Cited

U.S. PATENT DOCUMENTS

| | | | | |
|---|---|---|---|---|
| 5,754,938 A * | 5/1998 | Herz et al. | .................... | 725/116 |
| 5,835,905 A * | 11/1998 | Pirolli et al. | .......................... | 1/1 |
| 6,670,968 B1 * | 12/2003 | Schilit et al. | .................. | 715/760 |
| 7,277,879 B2 * | 10/2007 | Varadarajan | .................. | 707/794 |
| 7,685,525 B2 * | 3/2010 | Kumar et al. | ................. | 715/744 |
| 7,810,035 B2 * | 10/2010 | Dominowska et al. | ....... | 715/739 |
| 7,962,842 B2 * | 6/2011 | Carro | ............................. | 715/205 |
| 8,473,839 B2 * | 6/2013 | Koren | ............................ | 715/231 |
| 8,566,722 B2 * | 10/2013 | Gordon et al. | ................. | 715/721 |
| 2002/0087326 A1 * | 7/2002 | Lee et al. | ..................... | 704/270.1 |
| 2002/0188527 A1 * | 12/2002 | Dillard et al. | .................... | 705/27 |
| 2003/0227487 A1 * | 12/2003 | Hugh | ............................ | 345/777 |
| 2004/0006747 A1 * | 1/2004 | Tyler | .............................. | 715/530 |
| 2004/0044747 A1 * | 3/2004 | Trevor et al. | .................. | 709/217 |
| 2004/0049555 A1 * | 3/2004 | Schilit et al. | .................. | 709/217 |
| 2004/0098405 A1 * | 5/2004 | Zrubek et al. | ............. | 707/103 R |
| 2005/0188300 A1 * | 8/2005 | Sweet et al. | .................. | 715/514 |
| 2007/0027887 A1 * | 2/2007 | Baldwin | ....................... | 707/100 |
| 2007/0073758 A1 * | 3/2007 | Perry et al. | ..................... | 707/102 |
| 2007/0136318 A1 * | 6/2007 | Clark et al. | .................... | 707/100 |
| 2009/0110288 A1 * | 4/2009 | Fujiwara | ....................... | 382/190 |
| 2009/0119268 A1 * | 5/2009 | Bandaru et al. | .................... | 707/3 |
| 2009/0177711 A1 * | 7/2009 | Ferris et al. | ................... | 707/201 |
| 2009/0320073 A1 * | 12/2009 | Reisman | .......................... | 725/51 |
| 2010/0211905 A1 * | 8/2010 | Unz | ............................. | 715/776 |
| 2010/0287188 A1 * | 11/2010 | Kakar | ........................... | 707/769 |
| 2010/0306249 A1 * | 12/2010 | Hill et al. | ...................... | 707/769 |
| 2011/0283200 A1 * | 11/2011 | Koren | ............................ | 715/741 |
| 2012/0137200 A1 * | 5/2012 | Shar et al. | ...................... | 715/202 |
| 2012/0198330 A1 * | 8/2012 | Koppel et al. | ................. | 715/251 |
| 2013/0311862 A1 * | 11/2013 | Malla | ............................ | 715/206 |

* cited by examiner

*Primary Examiner* — Laurie Ries
(74) *Attorney, Agent, or Firm* — Lowenstein Sandler LLP

(57) ABSTRACT

A Navigation Control File for XML (NCX) generation module receives an electronic media item comprising input text. The electronic media item may also comprise links, where each link comprises a source position and a target position. The NCX generation module generates an NCX file for the electronic media item based on the input text and whether the links within the electronic media item satisfy one or more rules.

24 Claims, 11 Drawing Sheets

ANALYZING LINKS FOR NCX NAVIGATION

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like.

Certain electronic media items, such as electronic publications including ebooks, may have a table of contents (TOC) which provides information regarding the content and layout of the electronic publication. Some electronic media items may have a text based table of contents (e.g., the table of contents is pure text). Other electronic media items may have a linked table of contents (e.g., the table of contents includes HyperText Markup Language (HTML) links). Still other electronic media items may not have any table of contents information.

In addition, different types of electronic media items may allow for different types or styles of navigation through the electronic media item. For example, some electronic media items only allow for page by page navigation (e.g., a user cannot navigate or jump to a specific section of the electronic media item). Other electronic media items may allow a user to navigate to a specification section of the electronic media item, but only from the table of contents for the electronic media item. Still other electronic media items may use a navigation structure based on a Navigation Control File for XML (NCX file). An NCX file may allow for different styles of navigation, depending on the electronic device. For example, a user may navigate page by page using a left and right buttons, or using swipe gestures on a touch screen. In another example, the user may also navigate chapter by chapter by using up and down buttons. In a further example, the user may navigate to any section of the electronic media item from any location in the electronic media item. An NCX file may also contain a table of contents for the electronic media item.

When electronic devices present electronic media items (e.g., ebooks) to a user, the presentation of the electronic media items may be inconsistent or sub-optimal, due to the inconsistencies in the table of contents and navigation styles for the electronic media items. This results in an inconsistent or sub-optimal user experience when the user views and navigates through the first and second electronic media items.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for an NCX generation module that can generate an NCX file for an electronic media item. In one embodiment, the NCX generation module uses one or more of an ordering rule, a targeting rule, a positioning rule, and a title rule, to determine whether links in an electronic media item are heading candidates to be included in the NCX file. The rules are applied to the links or groups of links in the electronic media item, and links or groups of links which to not satisfy the rules are not included as heading candidates in the NCX file. Links or groups of links which do satisfy the rules are included as heading candidates in the NCX file and may also be used to generate a table of contents for the NCX file.

In another embodiment, an electronic media item may not contain any links, and the NCX generation module may use the content of the electronic media item in conjunction with semantic information (e.g., semantic rules) or formatting information (e.g., formatting rules), to obtain heading candidates to include in an NCX file.

In another embodiment, the NCX generation module may use any combination of the rules, the content of the electronic media item, semantic information and formatting information to obtain heading candidates to include in an NCX file.

Figure 1:
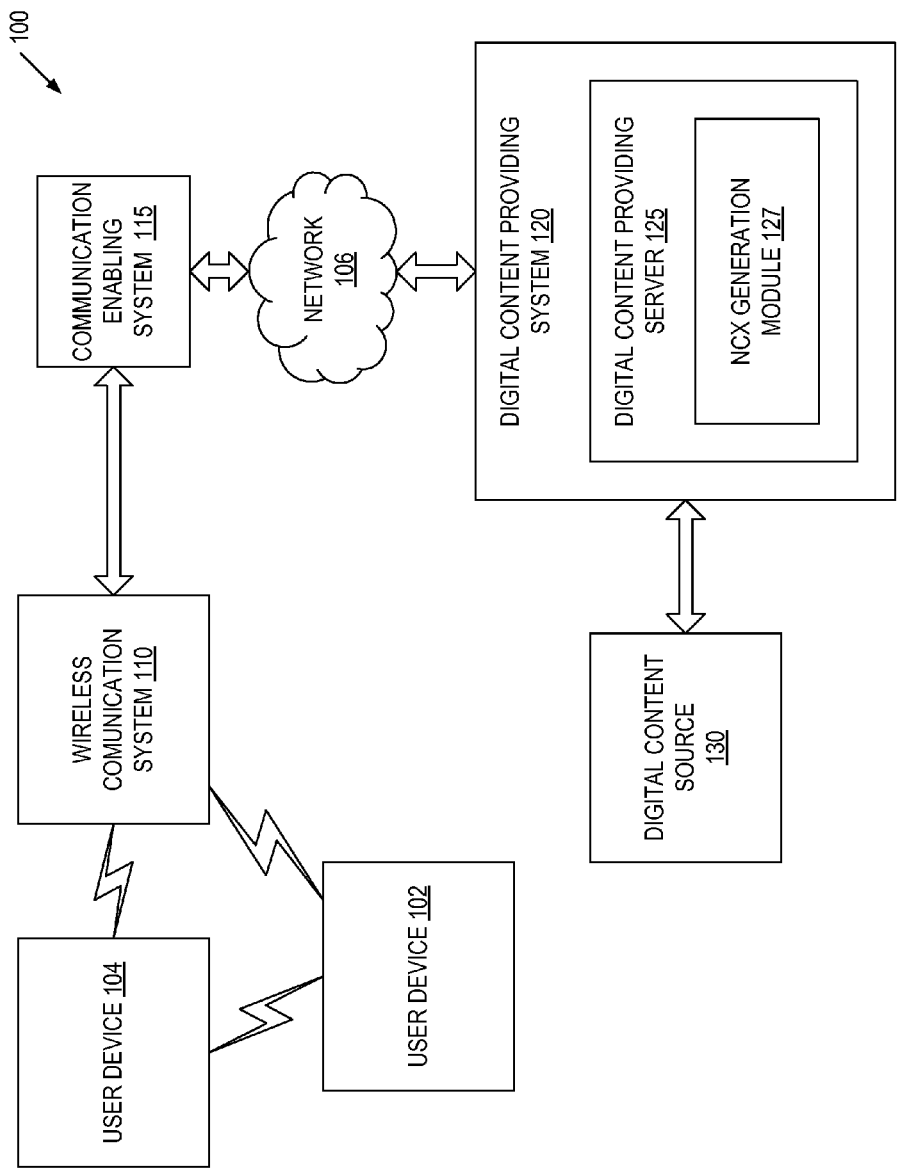
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books) to users upon the users' purchase of the items. In this role, the digital content providing server 125 may essentially act as a bookseller or the like. In other cases, the digital content providing server 125 corresponds to an entity which provides electronic media items to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic media items (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, digital content providing server 125 may include NCX generation module 127. NCX generation module 127 may generate an NCX file for an electronic media item. In another embodiment, the NCX generation module 127 may automatically generate the NCX file for the electronic media item (e.g., generate the NCX file without user input). The NCX file may comprise a table of contents and navigation metadata which may be used by an electronic device when navigating through the electronic media item. In one embodiment, the NCX generation module 127 may generate an NCX file based on existing links within the electronic media item. In one embodiment, a link may include a source position (e.g., a position of the link itself, such as a byte location within a file or a line/position within the electronic media item), a target position (e.g., a position of the target of the link, such as a byte location within a file or a line/position within the electronic media item), and, optionally, an identifier for the link. For example, a link may be an HTML link (e.g., an <a> tag), which has a link source, an HREF attribute which specifies the location of the target of the link, and a string which identifies the link (e.g., the name of the link).

The NCX generation module 127 may analyze the existing links and create groups of links. The NCX generation module 127 may also process or analyze the groups of using one or more of an ordering rule, a targeting rule, a positioning rule and a title rule. Links or groups of links which satisfy one or more of the rules may be heading candidates which are used to generate the NCX file (e.g., used as headings in the NCX file or used in the table of contents in the NCX file). In another embodiment, the NCX generation module 127 may generate an NCX file based on semantic information (e.g., keywords such as "chapter" or "section," or semantic rules). In a further embodiment, the NCX generation module 127 may generate an NCX file based on formatting information of the content (e.g., text after a page break may be considered a new chapter or section heading) within the electronic media item.

In one embodiment, the ordering rule may be used to identify a sub-group of a group of links, which satisfies the ordering rule. A sub-group of links may satisfy the ordering rule (and may be considered heading candidates) if, for every pair of links in the sub-group of links going in order from the first link to the last link, (e.g., links 1 and 2, links 2 and 3, links 3 and 4, links 4 and 5, etc.), the source position of a first link in the pair is smaller than the source position of a second link in the pair and the target position of the first link in the pair is also smaller than the target position of the second link in the pair. In another embodiment, the targeting rule also may be used to identify a sub-group of a group of links, which satisfies the targeting rule. A sub-group of links may satisfy the targeting rule if the target position of each link in the sub-group is less than the source position of the first link in the sub-group or the target position of each link is greater than its source position. In one embodiment, the targeting rule and the ordering rule may be applied to each group links to generate sub-groups of links. In one embodiment, the positioning rule may further be used to identify sub-groups of links which are within a certain threshold position from the beginning of the electronic media item or from the end of the electronic media item. This may also help locate a table of contents because a table of contents is generally located in the front or in the back of an electronic media item. In another embodiment, the title rule may be used to identify sub-groups of links which appear after a title, text, or a heading which indicates the start of a table of contents.

In one embodiment, the ordering rule, the targeting rule, the positioning rule, and the title rule may be applied to the groups or sub-groups of links in the electronic media item, in any order. For example, the targeting rule may be applied first, followed by the ordering rule, followed by the positioning rule, followed by the title rule. In another example, the ordering rule may be applied first, followed by the targeting rule, followed by the title rule, followed by the positioning rule.

NCX generation module 127 may generate NCX files for electronic media items currently offered to users by digital content providing server 125 or for newly received electronic media items from digital content source 130 before they are provided to a user. Digital content source 130 may be, for example, a publisher, author, creator, etc. of electronic media items or other digital content that provides the digital content to be distributed by digital content providing system 120. NCX generation module 127 is described in greater detail below with reference to FIGS. 2-10.

Figure 2:
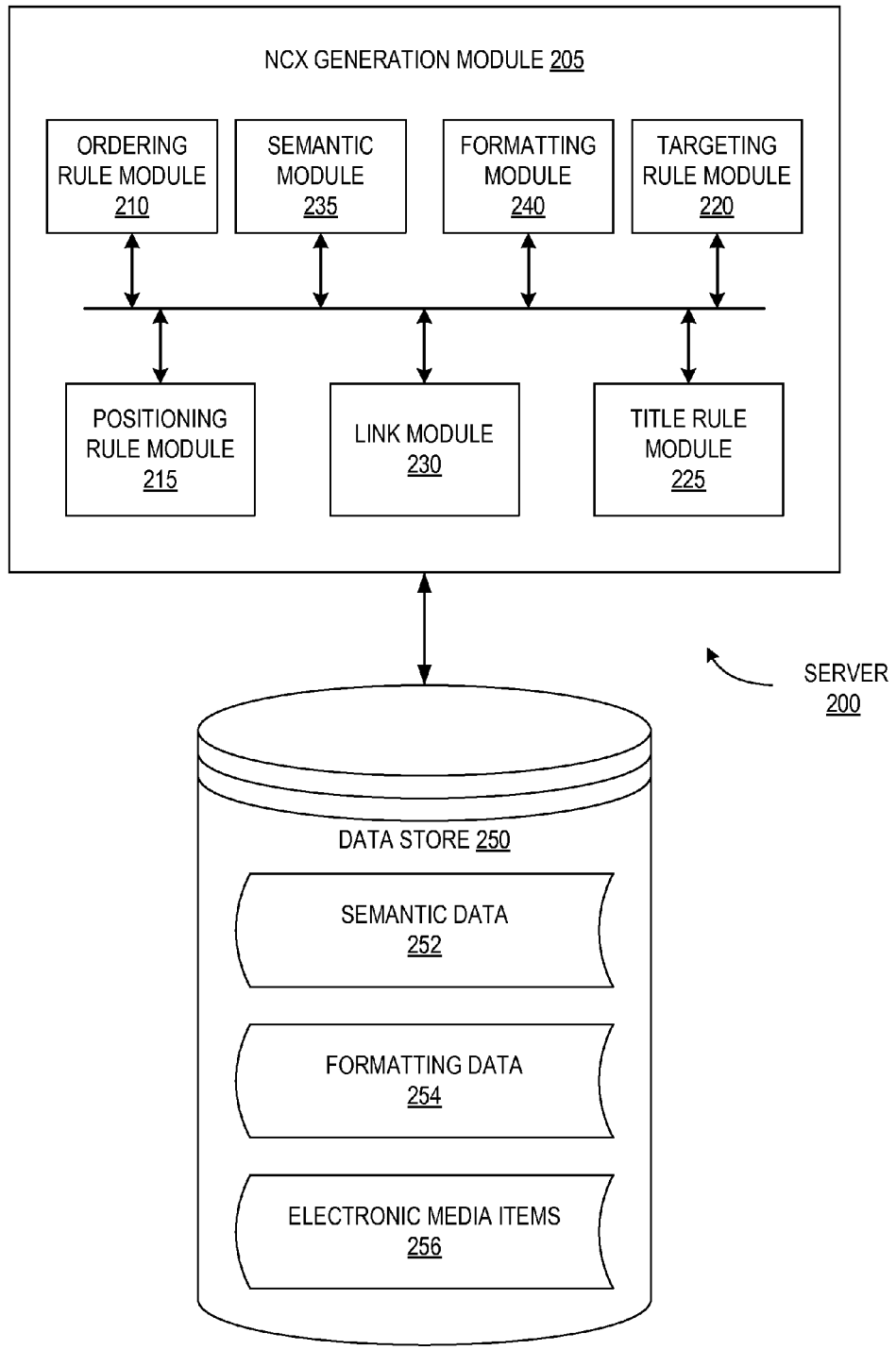
FIG. 2 is a block diagram illustrating an NCX generation module, according to an embodiment.

FIG. 2 is a block diagram of one embodiment of an NCX generation module 205 that may be included in a server 200 (e.g., digital content providing server 125 of FIG. 1). In one embodiment, server 200 includes NCX generation module 205, which may include an ordering rule module 210, a positioning rule module 215, a targeting rule module 220, a title rule module 225, a link module 230, a semantic module 235, and a formatting module 240. In one embodiment, NCX generation module 205 is connected to a data store 250, which may be a file system, database or other data management layer resident on a data storage device such as a disk drive, RAM, ROM, database, etc. Data store 250 may include semantic data 252, formatting data 254, and one or more electronic media items 256. In another embodiment, the NCX generation module 205 may generate NCX files for the one or more electronic media items 256 stored in the data store 250.

In one embodiment, the semantic data 252 may include keywords or semantic rules used to detect heading candidates to include in an NCX file for an electronic media item. The keywords may include, but are not limited to: "book," "chapter," "section," "part," "preface," "preamble," "prolog," and "epilogue." In one embodiment, the keywords may be in other languages, including, but not limited to, French, German, Spanish, Italian, Portuguese, Chinese, Japanese, etc. In another embodiment, the semantic data 252 may include semantic rules, which may be used by the semantic to detect heading candidates to include in an NCX file for an electronic media item. For example, the semantic data 252 may include a semantic rule which indicates that the keyword "chapter" should appear at least twice in the content in order to be considered a heading candidate. In another example, the semantic data 252 may include a semantic rule which indicates that the keyword "prologue" is always a heading candidate.

In one embodiment, the formatting data 253 may include formatting rules or requirements used to detect heading candidates. For example, the formatting data 253 may include a rule which states that the text immediately following a page break may be a heading candidate (e.g., may be a new chapter or new section heading). In another example, the formatting data 253 may include a rule which states that text which is formatted differently from the context text (e.g., text which is bolded or has a larger font size, etc.) may be a heading candidate. In a further example, the formatting data 253 may include a rule which states that a header tag (e.g., an <h1> tag) indicates a chapter break, and that text after the header tag may be a heading candidate (e.g., may be a new chapter heading or title).

In one embodiment, the link module 230 may analyze an electronic media item 256 and determine if there are links within the electronic media item 256. The link module 230 may also obtain the source position and the target position of each link within the electronic media item 256. The link module 230 may further group the links into one or more groups of links, based on the source positions of the links. In another embodiment, if the link module 230 determines that there are no links within the electronic media item 256, the semantic module 235 and the formatting module 240 may be used to obtain heading candidates. In a further embodiment, if there are links within the electronic media item 256, the link module 230 may provide the links (or groups of links) to one or more of the ordering rule module 210, the targeting rule module 215, the positioning rule module 220, and the title rule module 225.

In one embodiment, the ordering rule module 210 may generate sub-groups of links (from the groups of links obtained by the link module 230) which satisfy an ordering rule. In another embodiment, the positioning rule module 215 may also generate sub-groups of links (from the groups of links obtained by the link module 230) which satisfy a positioning rule. In one embodiment, the targeting rule module 220 may identify which sub-groups of links satisfy a targeting rule, and which sub-groups of links do satisfy the targeting rule. In another embodiment, the title rule module 225 may identify which sub-groups of links satisfy a title rule and which sub-groups of links do satisfy the title rule. Additional details of NCX generation module 205, the ordering rule, the targeting rule, the positioning rule, and the title rule are discussed below with respect to FIGS. 5-12.

Figure 3:
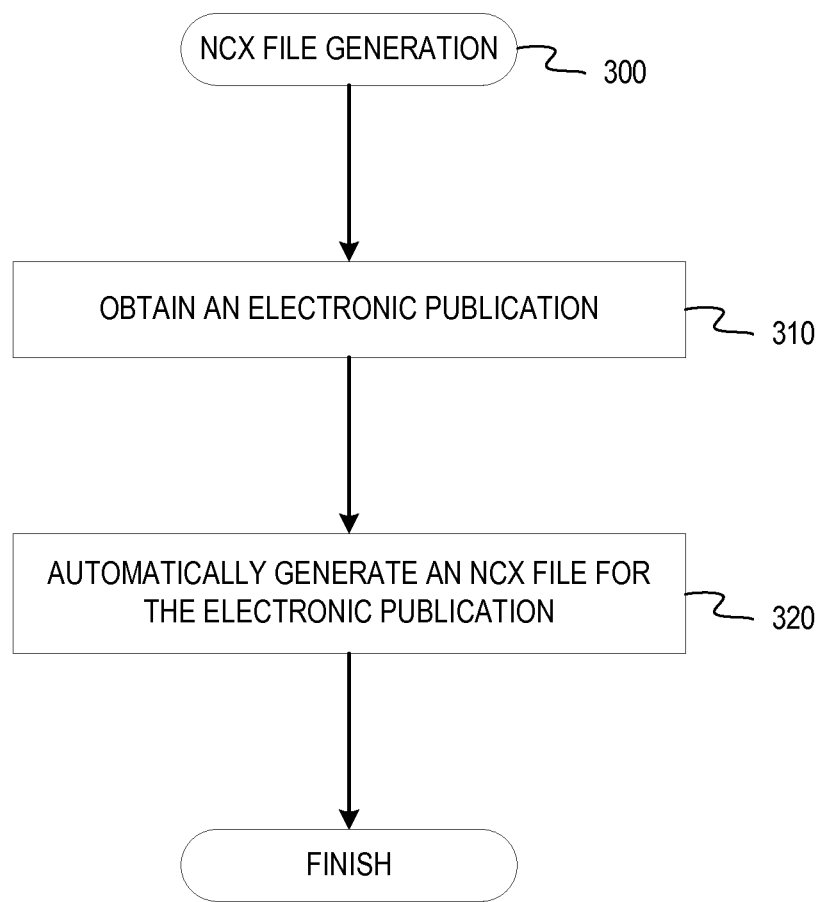
FIG. 3 is a flow diagram illustrating an NCX file generation method, according to an embodiment.

FIG. 3 is a flow diagram illustrating an NCX file generation method 300, according to an embodiment. The method 300 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate an NCX file. In one embodiment, method 300 may be performed by an NCX generation module, as shown in FIGS. 1 and 2.

Referring to FIG. 3, at block 310, method 300 obtains an electronic media item. In one embodiment, the electronic media item may be received by digital content providing system 120 from digital content source 130 to be provided to users of user devices 102, 104. In one embodiment, method 300 may be performed immediately as each new electronic media item is received, however in other embodiments, newly received items may be held for a certain period of time (e.g., until the end of the day) and then method 300 is performed for each item received during that time.

At block 320, the method 300 automatically generates an NCX file for the electronic media item (e.g., generates an NCX file without user input or interaction). As discussed above, electronic media item may contain links, which may be possible heading candidates to include in the NCX file. If the electronic media item does contain links, the one or more of an ordering rule, a targeting rule, a positioning rule, and a title rule, is applied to the links to determine which of the links in the electronic media item are heading candidates. If the electronic media item does not contain links, semantic information (e.g., keywords or semantic rules) and formatting information (e.g., page breaks, section breaks, font type, font size, etc.) are used to determine heading candidates. In one embodiment, the semantic information and the formatting information may still be used in addition to one or more of the ordering rule, the targeting rule, the positioning rule, and the title rule, even if the electronic media item contains links. For example, after applying the ordering rule, the targeting rule, the positioning rule, and the title rule to the links, the method may additionally use semantic formatting information to obtaining heading candidates.

Figure 4:
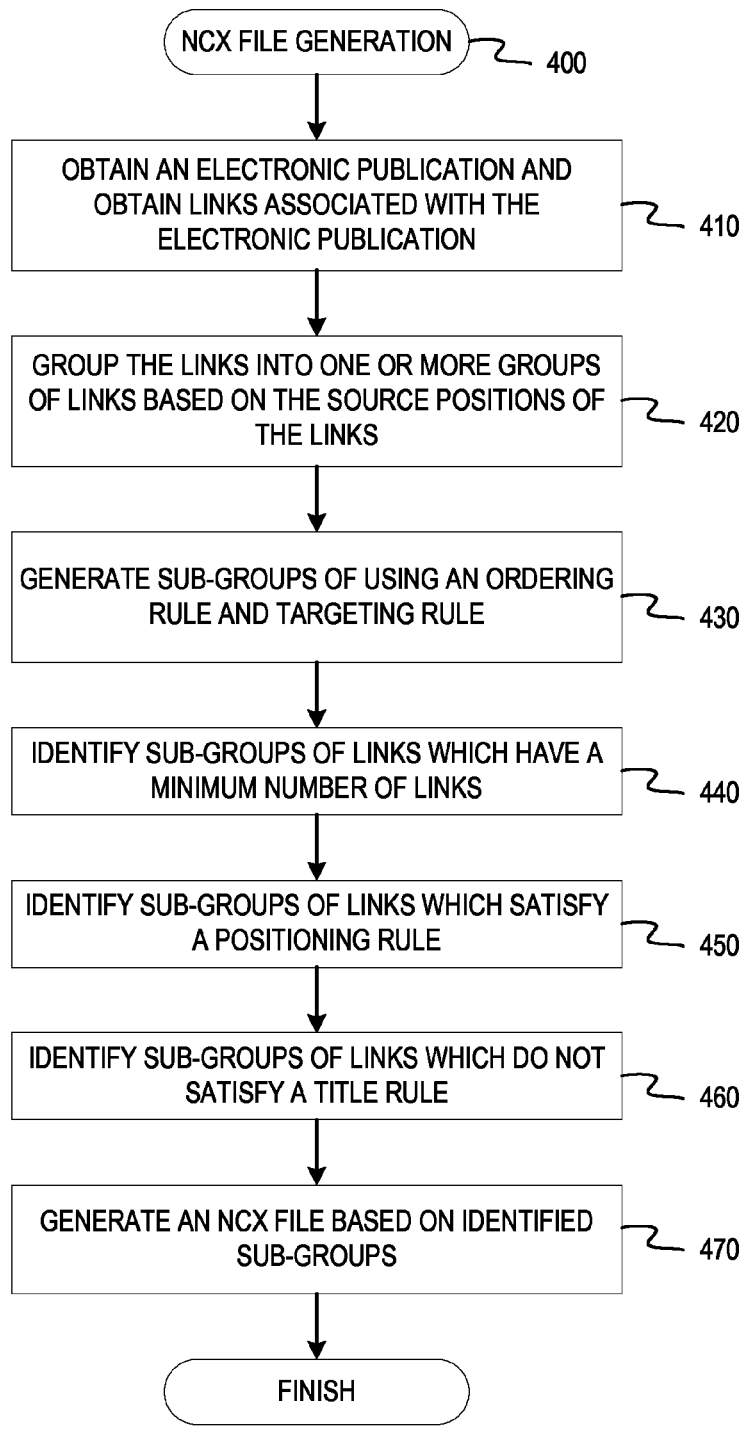
FIG. 4 is a flow diagram illustrating a more detailed NCX file generation method, according to an embodiment.

FIG. 4 is a flow diagram illustrating a more detailed NCX file generation method 400, according to an embodiment. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate an NCX file for an electronic media item. In one embodiment, method 400 may be performed by an NCX generation module, as shown in FIGS. 1 and 2.

Referring to FIG. 4, at block 410, method 400 receives an electronic media item and obtains links associated with (e.g., links within) the electronic media item. At block 420, the method 400 groups the links into one or more groups, based on the source positions of the links. For example, the method 400 may generate groups of links, such that the source positions of the links within a group are all within a certain distance of each other (e.g., each link in the group is no more than 2 lines away from another link in the group). In one embodiment, the threshold distance may be an average distance between the links in the electronic media item (e.g., the average distance between all the links may be 3 lines). In another embodiment, the threshold distance may also be determined by dividing the total length of the electronic media item (e.g., total number of lines) by the total number of links in the electronic media item. In another example, the method 400 may generate groups of links such that the source positions of the within a group are within a range of positions in the electronic media item (e.g., all links within the first 3 pages are in a group, all links within the second 3 pages, are in a group, etc.).

At block 430, the method 400 generates sub-groups of links from the groups of links using a targeting rule and an ordering rule. In different embodiments, the method 400 may apply the ordering rule and the targeting rule to the groups of links in a variety of orders. For example the method 400 may apply the ordering rule and targeting rule to each group separately (e.g., both rules are applied to a first group, and then both rules are applied to a second group, etc.).

At block 440, the sub-groups are analyzed to identify sub-groups of links which have a minimum number of links in the sub-group. For example, the method 400 may identify only sub-groups which have five or more links. In one embodiment, the sub-groups of links which meet the threshold are more likely to be heading candidates (e.g., table of contents entries). In other embodiments, the threshold may be set to any value (e.g., 3, 10, 25, 100, etc.).

At block 450, the method 400 identifies sub-groups of links which satisfy a positioning rule. At block 460, the method 400 identifies sub-groups of links which satisfy a title rule.

At block 470, the method 400 generates an NCX file based on the identified sub-groups. For example, only sub-groups which satisfy all of the ordering rule, the targeting rule, the positioning rule, and the title rule, and have a minimum number of links are included in the NCX file and are used in the table of contents within the NCX file.

In one embodiment, the electronic media item may include a "guide item." In one embodiment, the guide item may be data within the electronic media item which indicates that a table of contents exists within the electronic media item. The guide item may also indicate the starting location of the table of contents. Although the table of contents exists, there may not be an NCX file for the electronic media item. As discussed above, the NCX file allows for a consistent and efficient user experience for viewing and navigating through an electronic media item. Thus, even though a guide item exists (e.g., even though a table of contents exists) for an electronic media item, an NCX file may still be generated for the electronic media item. In one embodiment, if a guide item exists, blocks 420 and 440 may be skipped, because the guide item may provide information about an existing table of contents (e.g., location of existing table of contents links).

Figure 5:
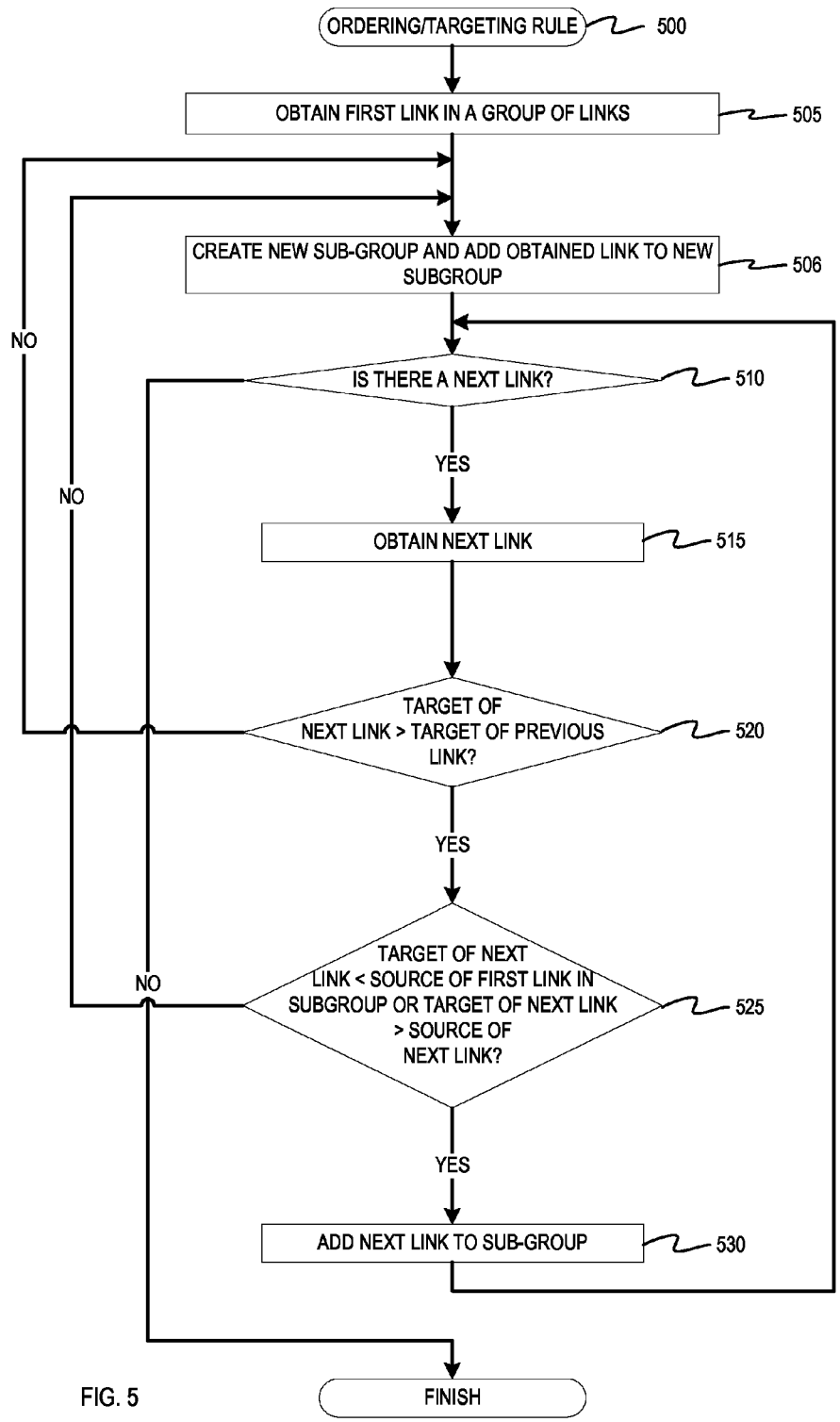
FIG. 5 is a flow diagram illustrating an ordering rule and a targeting rule, according to one embodiment.

FIG. 5 is a flow diagram illustrating a method 500 for an ordering rule and a targeting rule, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to analyze a group of links and generate sub-groups of links from the group of links. In one embodiment, method 500 may be performed by the NCX generation module, as shown in FIGS. 1 and 2. In another embodiment, the method 500 may be performed by the ordering rule module 210 and/or the targeting rule module 220, shown in FIG. 2.

Referring to FIG. 5, the method 500 may obtain a group links (not shown in the figure). At block 505, method 500 obtains the first link in the group of links. The method 500 creates new sub-group and adds the obtained link to the sub-group at block 506. At block 510, the method 500 determines whether there is a next link in the group of links. If there is no next link, the method 500 ends. If there is a next link, the method 500 proceeds to block 515 where the method 500 obtains the next link in the group of links. At block 520, the method 500 determines whether the target position of the next link is greater than the target position of the previous link in the sub-group of links (e.g., whether the next link satisfies the ordering rule). If the target position of the next link is less than the target position of the previous link, the method 500 proceeds to block 506 where a new sub-group is created and the obtained link (e.g., the next link) is added to the new sub-group. If the target position of the next link is greater than the target position of the previous link (e.g., the next link does satisfy the ordering rule), the method proceeds to block 525.

At block 525, the method 500 determines whether the target of the next link is less than the source of the first link in the sub-group of links, or whether the target of the next link is greater than the source of the next link (e.g., determines whether the target of the next link is outside of the sub-group). If the target of the next link is greater less the source of the first link in the group of links, or the target of the next link is greater than the source of the next link (e.g., the target of the next link is outside of the sub-group), the next link is added to the sub-group and the method proceeds back to block 510. If the target of the next link is greater than the source of the first link in the sub-group of links, and the target of the next link is less than the source of the next link (e.g., the target of the next link is inside of the sub-group), the method 500 proceeds to block 506 where a new sub-group is created and the obtained link (e.g., the next link) is added to the new sub-group.

Figure 6:
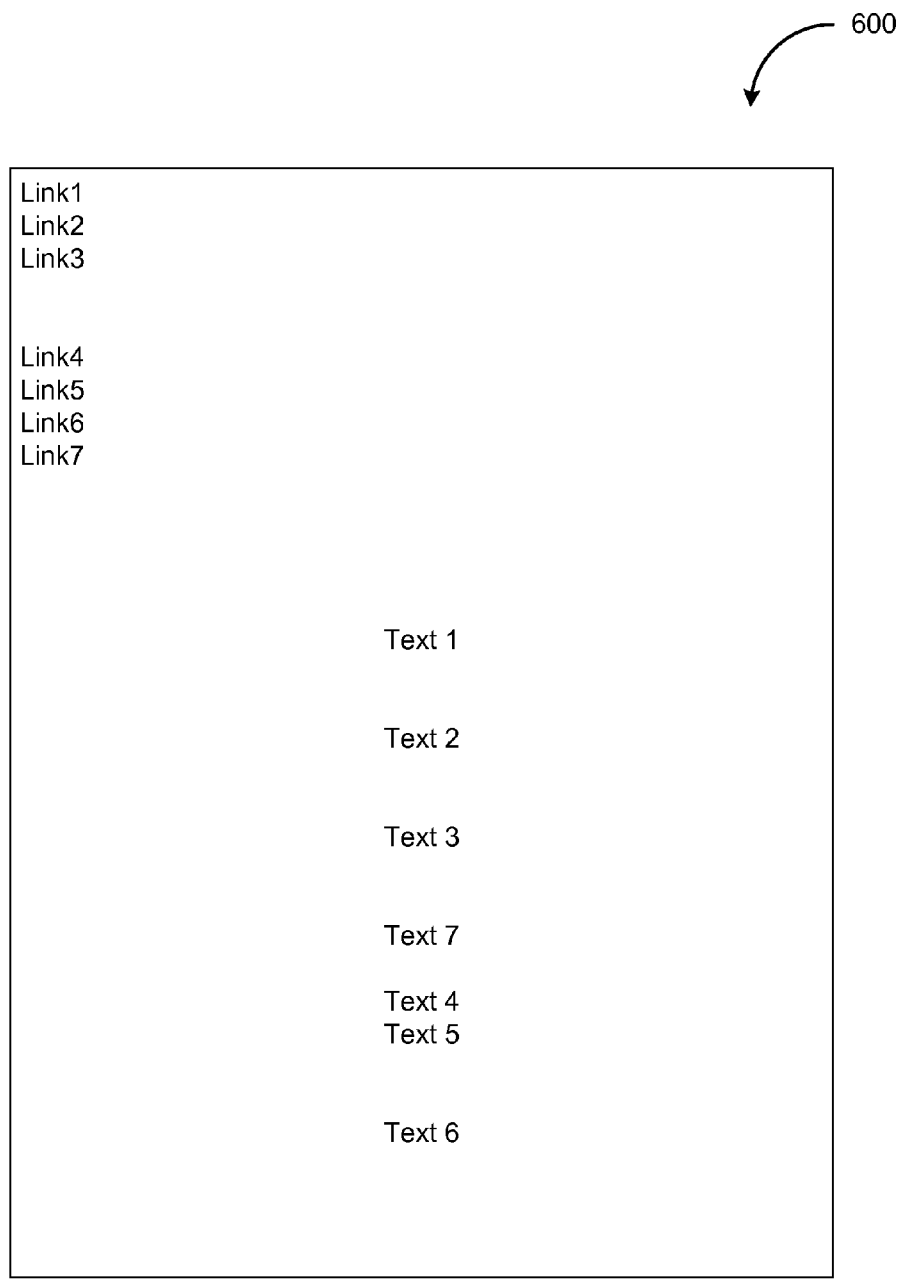
FIG. 6 is a diagram illustrating a first exemplary electronic media item, according to one embodiment.

FIG. 6 is a diagram illustrating a first exemplary electronic media item 600, according to one embodiment. The electronic media item 600 includes one or more links (e.g., Link1 through Link7). Each of the links points to a corresponding target (e.g., Link1 points to Text2, Link2 points to Text2, etc.). The links Link1 through Link7 may are grouped into two groups of links, the first group including Link1 through Link 3 and the second group including Link4 through Link7.

The method 500 shown in FIG. 5 may be applied to each of the two groups to determine to generate sub-groups. After performing method 500 on the electronic media item 600, Link1 through Link3 are grouped into a first sub-group, Link4 through Link6 are grouped in a second sub-group and Link7 is grouped in a third sub-group (by itself).

Figure 7:
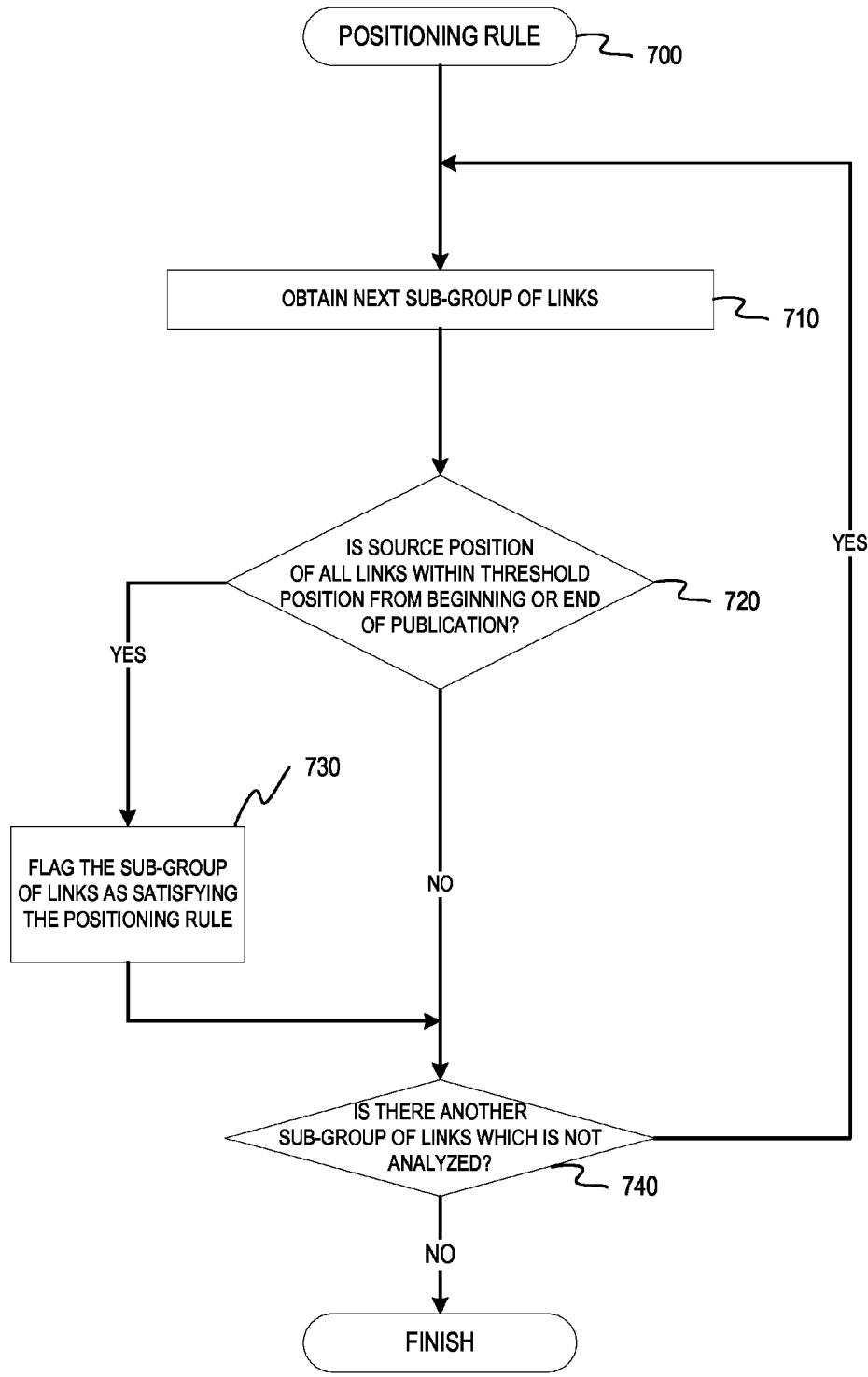
FIG. 7 is a flow diagram illustrating a positioning rule, according to one embodiment.

FIG. 7 is a flow diagram illustrating a method for a positioning rule, according to one embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to analyze sub-groups of links and identify sub-groups which do satisfy a positioning rule. In one embodiment, method 700 may be performed by the NCX generation module, as shown in FIGS. 1 and 2. In another embodiment, the method 700 may be performed by the positioning rule module 215 shown in FIG. 2. In a further embodiment, the method 700 may be performed on sub-groups which may be created using the method 500 shown in FIG. 5.

Referring to FIG. 7, method 700 obtains a next group of links at block 710. At block 720, the method 700 determines if the source position of each link in the sub-group of links is within a certain threshold position of the beginning of the publication or within a certain threshold position from the end of the publication. For example, the method 700 may determine whether each link is within the first 5 pages or first 150 lines of the beginning of the electronic media item. In another example, the method 700 may determine whether each link is within the last 7 pages or last 200 lines of the end of the electronic media item. If the source position of all links within the sub-group are within the threshold position from the beginning or end of the publication, the sub-group is flagged (e.g., identified) as satisfying the positioning rule at block 730 and the method 700 proceeds to block 740. If the source position of all links within the sub-group are not within the threshold position from the beginning or end of the publication, the method 700 proceeds to block 740.

At block 740, the method 700 determines whether there are any sub-groups of links which have not been analyzed. If there is another sub-group of links which has not been analyzed, the method 700 proceeds to block 710, where the next sub-group of links is obtained. If all sub-groups of links have been analyzed then the method 700 ends.

Figure 8:
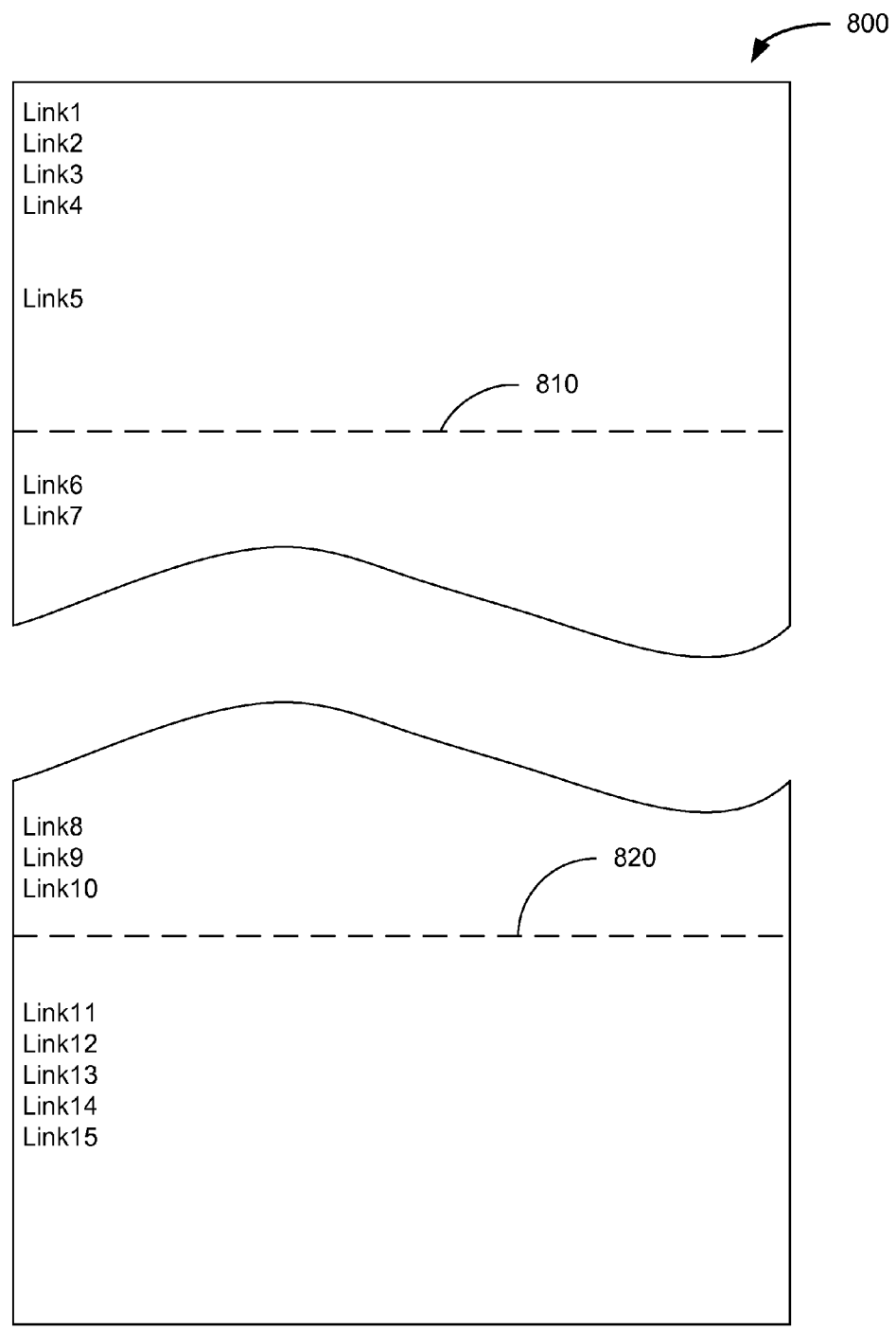
FIG. 8 is a diagram illustrating a second exemplary electronic media item, according to one embodiment.

FIG. 8 is a diagram illustrating a second exemplary electronic media item 800, according to one embodiment. The electronic media item 800 includes one or more links (e.g., Link1 through Link15). Link1 through Link15 are divided into five sub-groups of links, the first sub-group of links including Link1 through Link4, the second sub-group of links including Link5, the third sub-group of links including Link6 through Link7, the fourth sub-group of links including Link8 through Link10, and the fifth sub-group of links including Link11 through Link 15.

The method 700 shown in FIG. 7 may be applied to the electronic media item 800 to identify sub-groups of links which do satisfy the positioning rule. As shown in the figure, the third sub-group of links (e.g., Link6 and Link7) is outside the threshold position 810 from the beginning of the electronic media item 800. Also as shown in the figure, the fourth sub-group of links (Link8, Link9, and Link10), are outside the threshold position 820 from the end of the electronic media item 100. After performing method 700 on the electronic media item 800, the first sub-group, the second sub-group, and the fifth sub-group of links are identified (e.g., flagged) as satisfying the positioning rule.

Figure 9:
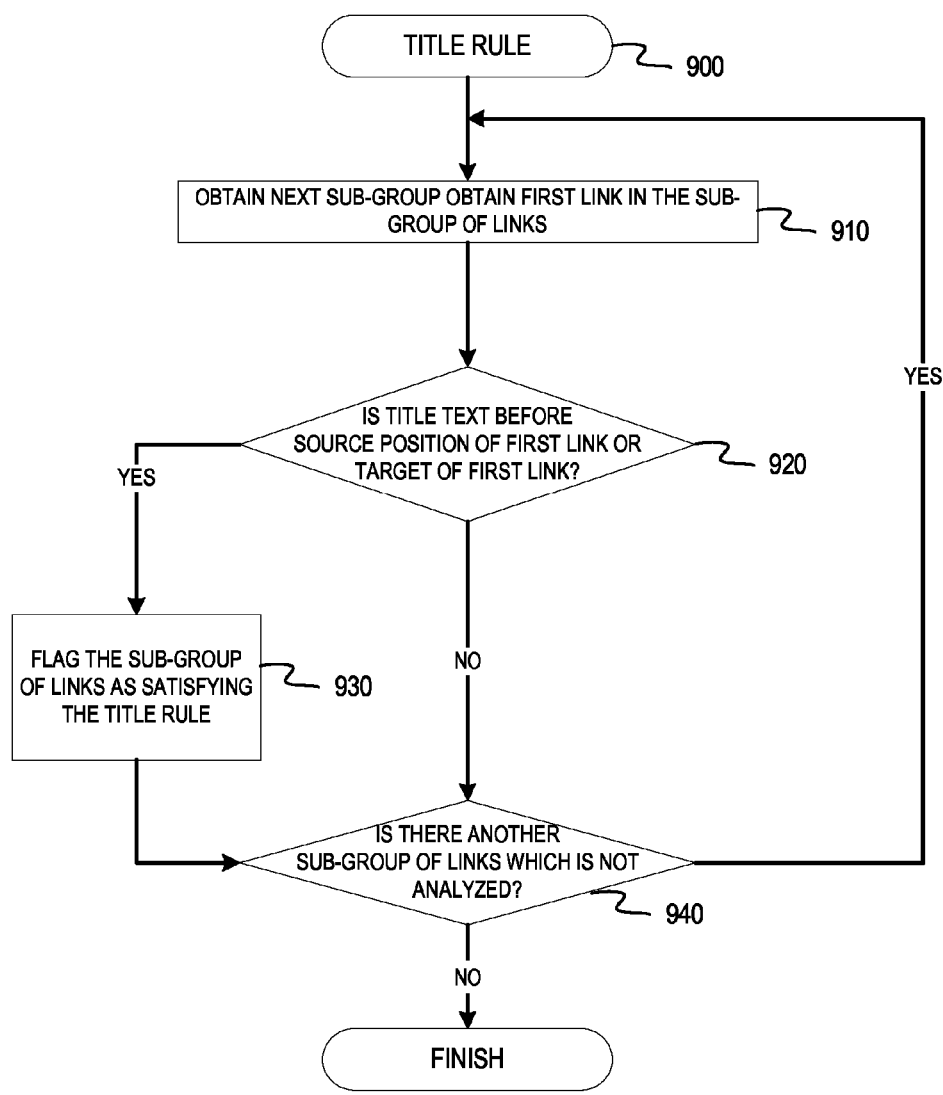
FIG. 9 is a flow diagram illustrating a title rule, according to one embodiment.

FIG. 9 is a flow diagram illustrating a method for a title rule, according to one embodiment. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to analyze sub-groups of links and identify sub-groups of links which not satisfy a title rule. In one embodiment, method 900 may be performed by the NCX generation module, as shown in FIGS. 1 and 2. In another embodiment, the method 900 may be performed by the title rule module 225 shown in FIG. 2.

Referring to FIG. 9, the method 900 may obtain a sub-group of links and may obtain the first link in the sub-group of links at block 910. At block 920, the method 900 determines whether there is title text before the source position of the first link in the sub-group. Title text may include, but is not limited to "Table of Contents," "Contents," and "TOC." The title text may indicate that a table of context follows the title text, and thus, links which appear after the title text may be heading candidates to include in the NCX file for an electronic media item. In one embodiment, the title text may also be in foreign languages, including, but not limited to French, German, Spanish, Italian, Portuguese, Chinese, Japanese, etc.

If there is title text before the source position of the first link or target of the first link, the sub-group is flagged (e.g., identified) as satisfying the title rule and the method 900 proceeds to block 940. If there is no title text before the source position of the first link or the target of the first link, the method 900 proceeds to block 940. At block 940, the method 900 determines whether there are sub-groups which are not analyzed. If there are sub-groups which have not been analyzed, the method 900 proceeds to block 910, where the next sub-group is obtained. If all sub-groups have been analyzed, the method 900 ends.

Figure 10:
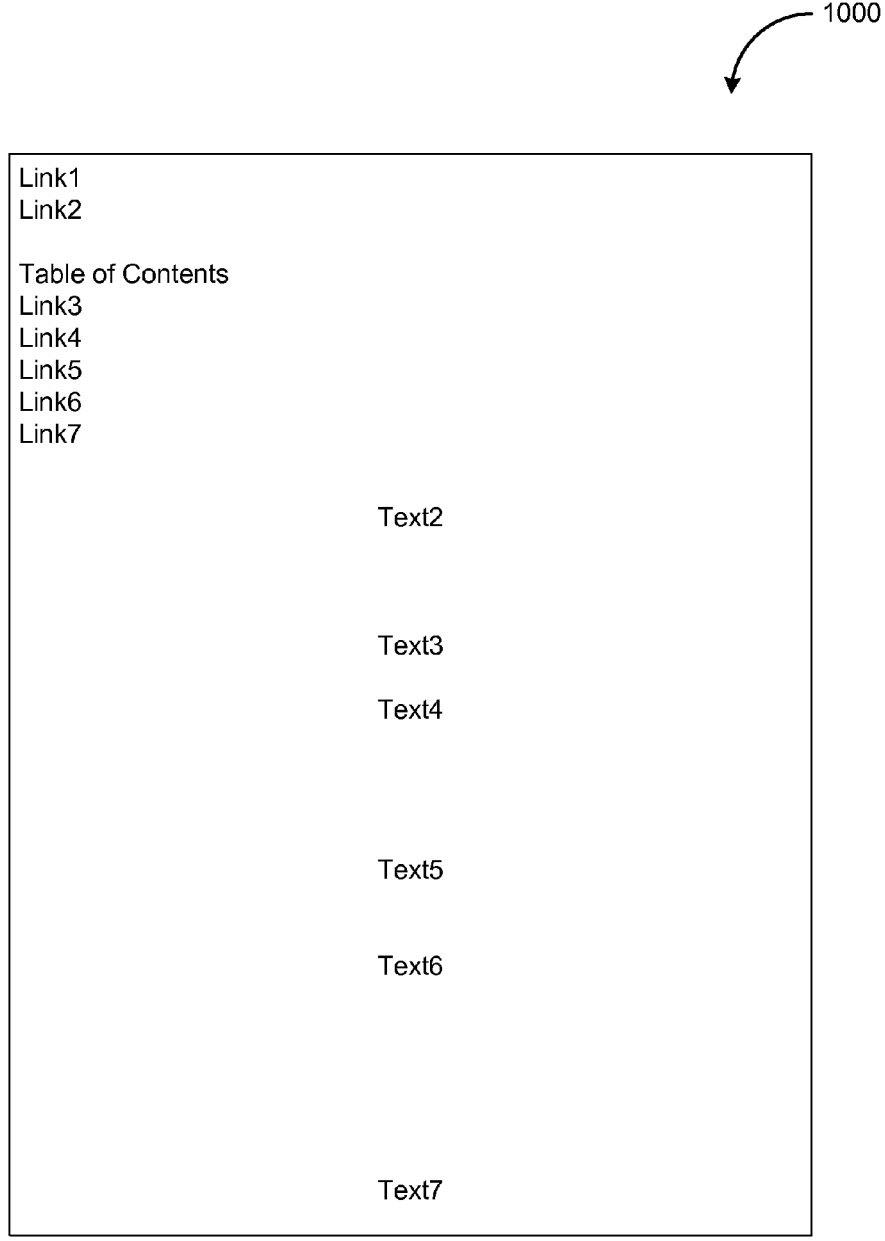
FIG. 10 is a diagram illustrating a third exemplary electronic media item, according to one embodiment.

FIG. 10 is a diagram illustrating a third exemplary electronic media item 1000, according to one embodiment. The electronic media item 1000 includes one or more links (e.g., Link1 through Link7). Each of the links points to a corresponding target (e.g., Link1 points to Text2, Link2 points to Text2, etc.). The links Link1 through Link7 may be grouped into two sub-groups of links, the first sub-group including Link1 through Link2 and the second group including Link3 through Link7.

The method 900 shown in FIG. 9 may be applied to the electronic media item 1000 to identify sub-groups of links which satisfy the title rule. After performing method 900 on the electronic media item 1000, the second sub-group (e.g., Link3 through Link7) is flagged (e.g., identified) as satisfying the title rule.

Figure 11:
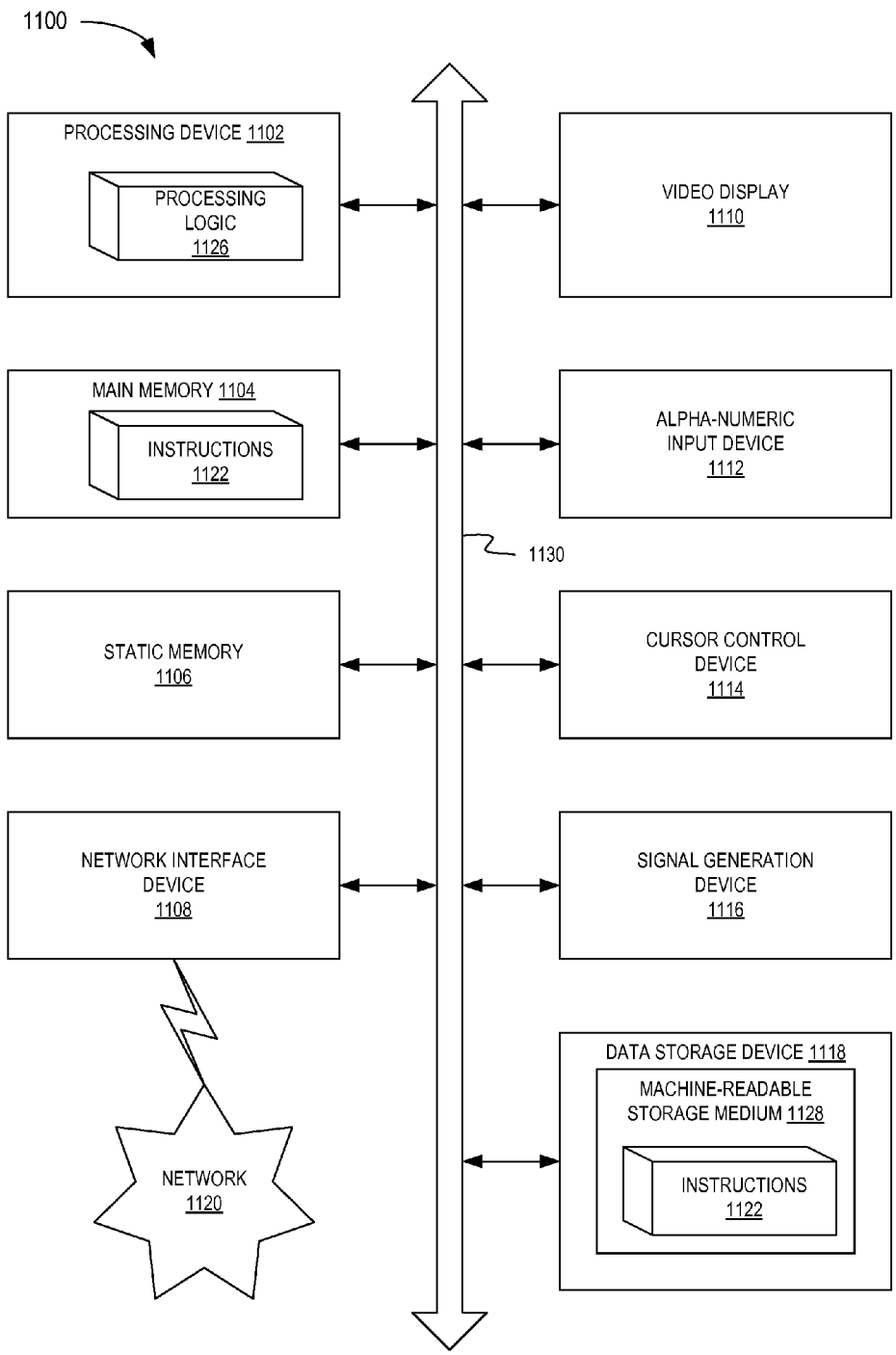
FIG. 11 is a block diagram illustrating one embodiment of a computer system, according to an embodiment.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute the NCX generation module 127 for performing the operations and steps discussed herein.

The computer system 1100 may further include a network interface device 1108 which may communicate with a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of NCX generation module 127) embodying any one or more of the methodologies or functions described herein. The instructions 1122 may also reside, completely or at least partially, within the main memory 1104 and/or within processing logic 1126 of the processor 1102 during execution thereof by the computer system 1100, the main memory 1104 and the processor 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "grouping," "identifying," "generating," "determining," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   obtaining a plurality of links associated with an electronic media item;
   grouping the plurality of links into one or more groups of links based on source positions of the plurality of links;
   generating sub-groups of links from the one or more groups of links using an ordering rule and a targeting rule;
   identifying the sub-groups which have a minimum number of links; and
   generating, by a processing device, a navigation control file, based on the identified sub-groups, wherein a link within a sub-group of links satisfies the targeting rule when a target position of the link is less than a first source position of a first link in the sub-group or when the target position of the link is greater than a source position of the link.

2. The method of claim 1, further comprising:
   identifying the sub-groups which satisfy a positioning rule, prior to generating the navigation control file.

3. The method of claim 2, wherein a sub-group of links satisfies the positioning rule when a source position of each link in the sub-group is within a first threshold position from a beginning of the electronic media item or within a second threshold position from an end of the electronic media item.

4. The method of claim 1, further comprising
   identifying the sub-groups which satisfy a title rule, prior to generating the navigation control file.

5. The method of claim 4, wherein a sub-group of links satisfies the title rule by having pre-determined text located before a first link in the sub-group of links.

6. The method of claim 1, wherein a sub-group of links satisfies the ordering rule when each link in the sub-group of links has a first source position before a second source position of a next link and has a first target position before a second target position of the next link.

7. The method of claim 1, wherein the navigation control file is a Navigation Control File for Extensible Markup Language (NXC) file.

8. A non-transitory computer-readable storage medium storing instructions which, when executed, cause a processing device to perform operations comprising:
   obtaining an electronic media item;
   analyzing a plurality of links in the electronic media item; and
   automatically generating, by the processing device, a table of contents information and navigation information for the electronic media item, based on the plurality of links, wherein generating the table of contents information and the navigation information comprises:
      generating sub-groups of links from the one or more groups of links using an ordering rule and a targeting rule; and
      generating the table of contents information and the navigation information based on the sub-groups of links.

9. The non-transitory computer-readable storage medium of claim 8, wherein generating the table of contents information and the navigation information comprises:
   grouping the plurality of links into one or more groups of links based on source positions of the plurality of links;
   identifying the sub-groups which have a minimum number of links; and
   generating the table of contents information and the navigation information, based on the identified sub-groups.

10. The non-transitory computer-readable storage medium of claim 8, wherein the operations further comprise:
    identifying the sub-groups of links which satisfy a positioning rule, prior to generating the table of contents information and the navigation information; and
    generating the table of contents information and the navigation information based on the identified sub-groups.

11. The non-transitory computer-readable storage medium of claim 10, wherein a sub-group of links satisfies the positioning rule when a source position of each link in the sub-group within a first threshold position from a beginning of the electronic media item or within a second threshold position from an end of the electronic media item.

12. The non-transitory computer-readable storage medium of claim 8, wherein the operations further comprise:
    identifying the sub-groups of links which satisfy a title rule, prior to generating the table of contents information and the navigation information; and
    generating the table of contents information and the navigation information based on the identified sub-groups.

13. The non-transitory computer-readable storage medium of claim 12, wherein a group of links satisfies the title rule by having pre-determined text located before a first link in the sub-group of links.

14. The non-transitory computer-readable storage medium of claim 8, wherein a sub-group of links satisfies the ordering rule when each link in the sub-group of links has a first source position before a second source position of a next link and has a first target position before a second target position of the next link.

15. The non-transitory computer-readable storage medium of claim 8, wherein a link within a sub-group of links satisfies the targeting rule when a target position of the link is less than a first source position of a first link in the sub-group or when the target position of the link is greater than a source position of the link.

16. The non-transitory computer-readable storage medium of claim 8, wherein generating the table of contents information and the navigation information further comprises
    using semantic rules and content of the electronic media item to generate the table of contents information and the navigation information.

17. The non-transitory computer-readable storage medium of claim 8, wherein generating the table of contents information and the navigation information further comprises
    using formatting rules and content of the electronic media item to generate the table of contents information and the navigation information.

18. The non-transitory computer-readable storage medium of claim 8, wherein the navigation control file is a Navigation Control File for Extensible Markup Language (NXC) file.

19. An apparatus comprising:
    a memory configured to store an electronic media item;
    a processing device coupled to the memory and configured to:

analyze a plurality of links in the electronic media item;

generate sub-groups of links from the one or more groups of links using an ordering rule and a targeting rule, from each group of links;

identify the sub-groups which satisfy a positioning rule; and automatically generate a navigation control file for the electronic media item based on the identified sub-groups of links, wherein the sub-groups are identified prior to the generation of the navigation control file.

20. The apparatus of claim 19, wherein the processing device generates the navigation control file by:

grouping the plurality of links into one or more groups of links based on source positions of the plurality of links;

identifying the sub-groups that have a minimum number of links; and generating the navigation file, based on the identified sub-groups.

21. The apparatus of claim 19, wherein the processing device is further configured to:

identify the sub-groups which satisfy a title rule, prior to generating the navigation control file; and generate the navigation control file based on the identified sub-groups of links.

22. The apparatus of claim 19, wherein the processing device generates the navigation control file using semantic rules and content of the electronic media item.

23. The apparatus of claim 19, wherein the processing device generates the navigation control file using formatting rules and content of the electronic media item.

24. The apparatus of claim 19, wherein the navigation control file is a Navigation Control File for Extensible Markup Language (NXC) file.

* * * * *